May 26, 1936.　　　D. B. HOWELL　　　2,041,765
GLAZING APPARATUS
Filed April 30, 1932　　　2 Sheets-Sheet 1
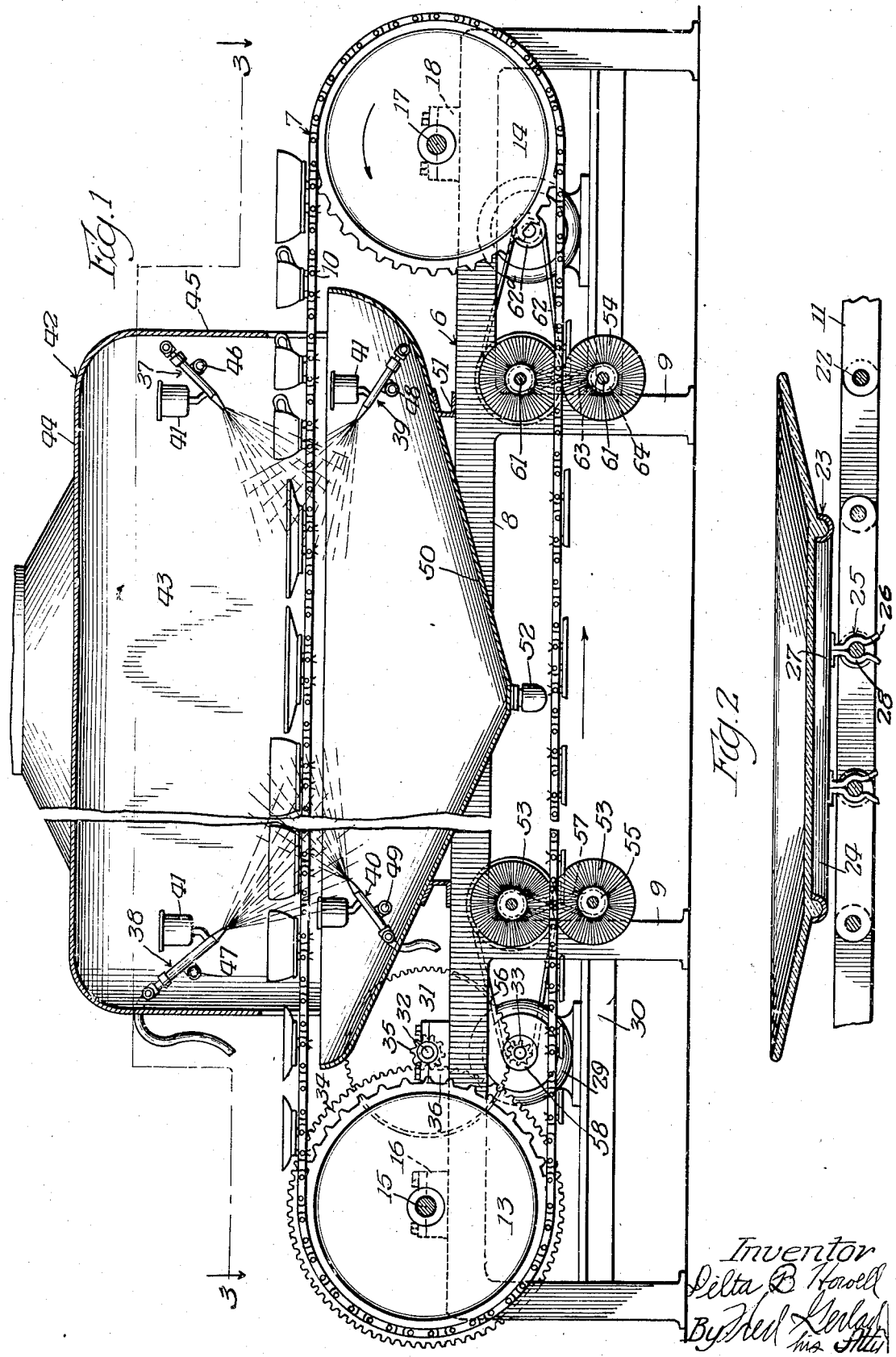

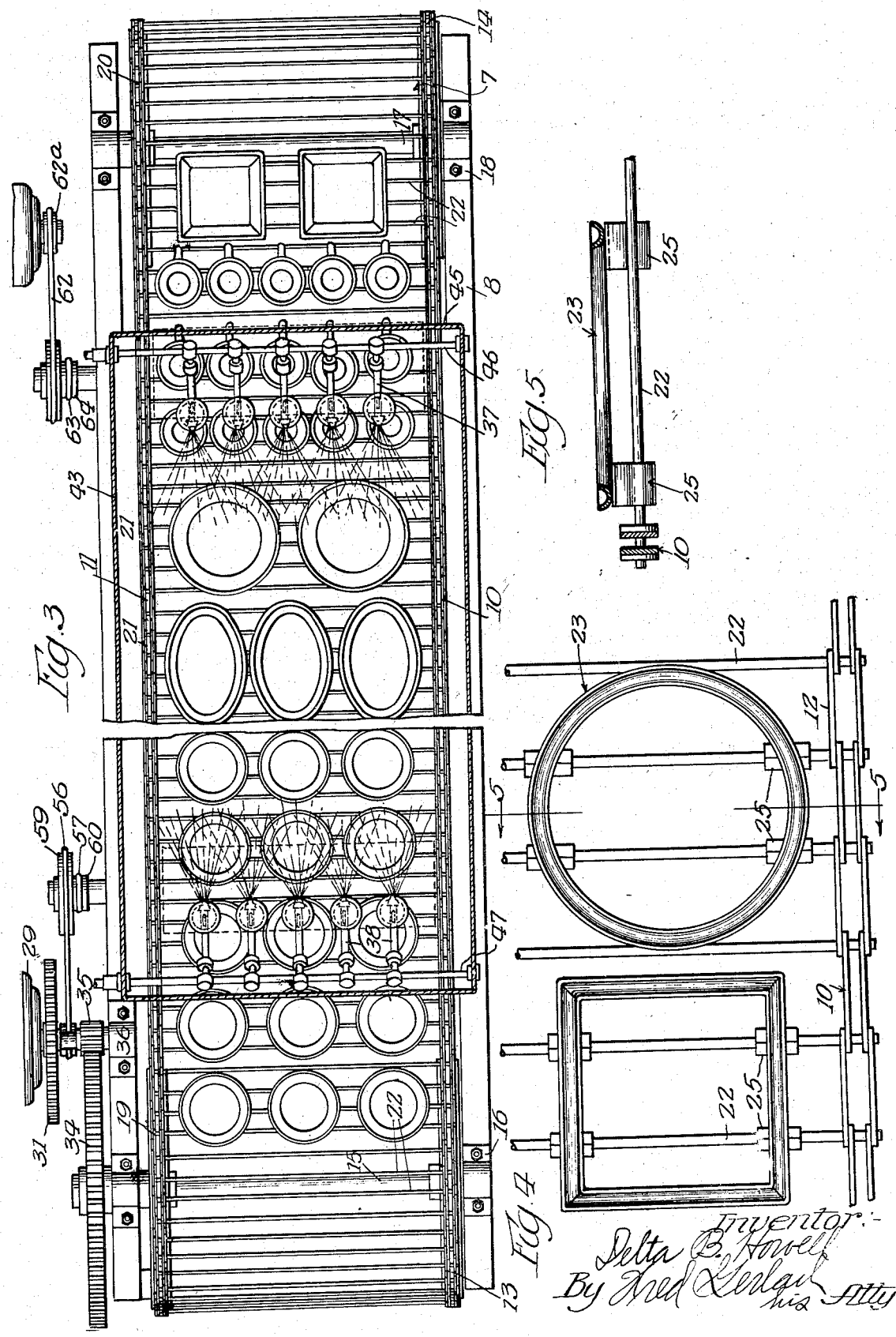

Patented May 26, 1936

2,041,765

UNITED STATES PATENT OFFICE 2,041,765

GLAZING APPARATUS

Delta B. Howell, Murphysboro, Ill.

Application April 30, 1932, Serial No. 608,371

12 Claims. (Cl. 91—45)

In general, the present invention has reference to glazing apparatus. More particularly, the invention has reference to that type of glazing apparatus which is adapted primarily for use in connection with the glazing of plates, saucers, cups, bowls, dinnerware, platters, lamp bases, figures and all clay products having foot-forming beads on the under faces thereof.

Heretofore it has been customary in the glazing of clay products, to dip the articles in a vat or other receptacle containing the glazing material in order to cover them completely with the material, and then directly after the dipping step to wipe the glazing material off the foot-forming beads so that the latter do not stick or adhere to the cranks or saggers which are used to support the articles during the final firing or burning operation. In order to eliminate or reduce breakage or crumbling of the articles during the dipping step, it has heretofore been necessary to fire the articles by a preliminary firing operation in order to make them sufficiently hard to permit of ready handling. Because of this preliminary firing operation and the work incident thereto, the cost of glazing by the dipping process has proved in practice to be exceedingly costly.

The primary object of the present invention is to provide an apparatus which contemplates the glazing of clay articles in an extremely expeditious manner and without the necessity of subjecting the articles to a preliminary firing operation. In general, this apparatus comprises an endless conveyor which is adapted to be driven at a comparatively slow speed and carries a series of setters for receiving and protecting the foot-forming beads on the under sides of the articles and supporting the articles in an upright position. In addition, the apparatus comprises a housing through which the articles are carried by the conveyor and in which the glazing material is applied to the articles by a spraying process.

Another object of the invention is to provide a glazing apparatus of the last mentioned character in which the conveyor comprises a pair of laterally spaced chains, and the setters are releasably attached to rods between the chains so that they may be removed and others of different design substituted therefor.

A still further object of the invention is to provide glazing apparatus of the type and character under consideration which includes a plurality of rotary brushes for cleaning the setters after they have passed through the housing and the articles have been discharged therefrom.

A still further object of the invention is to provide an apparatus for use in the glazing of clay articles which is generally of new and improved construction, may be manufactured and produced at a low cost and is extremely efficient in operation.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical longitudinal section of an apparatus embodying the invention, illustrating in detail the manner in which the spray guns operate within the housing to spray the glazing material on the articles as the latter are moved through the housing in response to drive of the endless conveyor;

Figure 2 is an enlarged vertical section of one of the setters which are used to support plates;

Figure 3 is a horizontal section on the line 3—3 of Figure 1;

Figure 4 is an enlarged plan view of a portion of the endless conveyor; and

Figure 5 is a section on the line 5—5 of Figure 4.

The apparatus which forms the subject matter of the invention is designed for use in connection with the glazing of plates, saucers, cups, bowls, dinnerware, platters, lamp bases and all clay products having circular, square, oblong, oval or irregular foot-forming beads on the under surfaces thereof. It is substantially automatic and comprises an elongated frame 6 and a horizontally extending, endless conveyor 7. The frame 6 is preferably fabricated or formed of structural steel parts and consists of a pair of horizontally extending, laterally spaced beams 8 and a plurality of uprights 9. The uprights hold the beams 8 in an elevated position, as shown in Figure 1 of the drawings, and are adapted to rest upon the floor of the room in which the apparatus is disposed. The endless conveyor 7 is supported on the frame 6 between the beams 8 and consists of a pair of horizontally extending, laterally spaced, endless chains 10 and 11. The chain 10 consists of an endless series of pairs of links 12 and extends around a drive sprocket 13 and an idler sprocket 14. The drive sprocket 13 is located at one end of the frame 6 and is keyed or otherwise fixedly secured to one end of a shaft 15 which extends horizontally and is journalled in bearings 16 on the beams 8. The idler sprocket 14 is located at the other end of the frame and is mounted on a horizontally extending shaft 17, the latter is journalled in a pair of brackets 18 which are secured to and supported on the beams 8 of the frame 6. The chain 11 extends around a drive sprocket 19 and an idler sprocket 20 and consists of an endless series of pairs of links 21. The drive sprocket 19 is mounted on the shaft 15 and corresponds in diameter to the drive sprocket 13 for the chain 10. The idler sprocket 20 corresponds in diameter to the idler sprocket 14 and is mounted on the horizontally extending shaft 17. The chains 10 and 11 are cross connected by means of a series of horizontally extending, round rods 22. These rods extend between the two chains and are arranged so that the ends thereof which are associated with the chain 10, extend through and join together the contiguous ends of the pairs of links 12 and form the pivot pins or articulation points for the latter. The other ends of the rods, that is, the ends which are associated with the chain 11, extend through and join together the contiguous ends of the pairs of links 21.

The articles, after formation thereof and without being fired, are supported on the upper reach of the conveyor 7 by means of a series of setters 23. These setters are designed to conform to the different bead formations on the under faces of the articles, and are formed of sheet metal bands 24 which are substantially semi-circular in cross section and receive and cover the foot-forming beads or other projections on the bottom parts of the articles in order to prevent such beads or projections from being coated with glaze and thereby eliminate the wiping off of the glaze prior to the burning or firing operation. In addition to preventing the beads from being coated with glaze, the setters serve to prevent distortion or warpage of the articles (clay state) both before and after application of the glaze. The setters are connected removably to the rods 22 by means of clips 25. Each of these clips consists of a pair of oppositely facing, sheet metal fingers 26 which have attaching tongues 27 at the upper ends thereof and embody semi-circular, rod-retaining seats 28 in their central portions. The tongues 27 at the upper ends of the clip-fingers are soldered or otherwise secured to the lower portions of the setters. Each setter is preferably provided with four clips and is adapted to be supported by two of the rods 22. By virtue of the fact that spring clips are used to attach the setters to the rods, the setters may be readily removed and others substituted therefor. The lower ends of the spring fingers of the clips are bent outwardly so as to facilitate snapping of the clips around the rods. The articles are adapted to be manually placed upon the setters in such a manner that the beads on the under faces thereof rest within the channels or grooves in the setters. By so positioning the articles, all surfaces of the articles, with the exception of the beads, are exposed for glazing purposes.

The conveyor chains 10 and 11 are driven so as to move the articles from the idler sprockets 14 and 20 towards the drive sprockets 13 and 19. This mechanism comprises an electric motor 29 which is mounted on a platform 30 under the horizontally extending shaft 15; a gear 31 which is mounted on a horizontally extending shaft 32 and meshes with and is driven by a pinion 33 on one end of the rotor shaft of the electric motor 29; and a gear 34 which is fixed to the shaft 15 and meshes with and is driven by a pinion 35 on the shaft 32. The shaft 32 is located above the motor, as shown in Figure 1 of the drawings, and is mounted on bearings 36 on the horizontally extending beams 8 of the frame 6. When current is supplied to the motor, the conveyor 7 is driven so that the articles on the upper reach thereof are moved from the idler sprockets towards the drive sprockets, as previously pointed out. When the articles reach a position over the idler sprockets, they are preferably manually removed from the setters.

During travel of the articles on the conveyor, glazing material is supplied thereto by means of a series of spray guns 37, a series of spray guns 38, a series of spray guns 39 and a series of spray guns 40. These guns are of the pneumatic variety and are connected by hoses to any suitable source of compressed air. They are supplied with glazing material from reservoirs 41 and operate in response to flow of compressed air therethrough, to spray the material onto the articles as the latter are moved from one end of the frame to the other in response to drive of the conveyor. The spray guns 37 and 38 are adapted to spray the glazing material onto the top surfaces of the articles and are associated with a housing 42. The latter is positioned directly over the central portion of the upper reach of the conveyor and comprises side walls 43, a top wall 44 and end walls 45. The end walls are spaced sufficiently above the conveyor so as to form entrance and exit passages for the articles. The spray guns 37 are positioned above the entrance passage and are supported on a horizontally extending shaft 46 which extends through, and is carried by, the side walls 43 of the housing 42. By rotating the shaft 46, the guns 37 may be positioned at the desired angle. Preferably, the guns are arranged so that they extend downwardly and away from the entrance passage and spray the glazing material onto the articles from an angle of approximately 45°. The spray guns 38 are located adjacent to the exit passage of the housing 42 and are mounted on a horizontally extending shaft 47. The latter extends through, and is carried by, the side walls of the housing and is rotatable similarly to the shaft 46 so that the guns 38 may be adjusted to the proper angle. The spray guns 39 and 40 are located under the central portion of the upper reach of the conveyor 7 and are adapted to spray the glazing material upwardly between the rods 22 onto the bottom or under surfaces of the articles. The guns 39 are located beneath the spray guns 37 and are mounted on a horizontally extending, rotatably adjusted shaft 48. They are preferably positioned so that they extend upwardly and away from the entrance passage of the housing, and direct the material upwardly at approximately an angle of 45°. The spray guns 40 are located adjacent to the exit passage of the housing 42 and are mounted on a horizontally extending shaft 49. The latter, like the shaft 48, is rotatably adjustable and operates to support the guns 40 so that they extend upwardly and away from the aforementioned exit passage. The surplus glazing material is caught in a pan 50 which is supported under the upper reach of the conveyor 7 by means of crossbars 51 on the horizontally extending beams 8 of the frame 6. The central portion of the pan is substantially conical and embodies in the apex portion thereof, an outlet or drainage pipe 52. The end parts of the pan support the shafts 48 and 49 for the spray guns 39 and 40 and underlie the entrance and exit passages of the housing 42.

In order to clean the rods 22 and the setters 23 after discharge or removal of the articles, a pair of brushes 53 and a pair of brushes 54 are provided. These brushes are associated with the lower reach of the conveyor and are driven as hereinafter described, so that they brush off the glazing material which accumulates on the rods and the setters during passage of the latter between the housing 43 and the pan 50. The brushes 53 are mounted on horizontally extending shafts 55 and are arranged one above the other and so that they straddle the lower reach of the conveyor. They are driven in opposite directions from the electric motor 29 by means of a belt 56 and a belt 57. The belt 56 is driven from a pulley 58 on the rotor shaft of the motor and extends around a pulley 59 on one end of the shaft of the uppermost brush 53. The belt 57 extends around pulleys 60 (see Fig. 3) on the shafts 55 and is crossed, as shown in Figure 1, so that the brushes are driven in opposite directions in response to drive of the belt 56 via the motor 29. The brushes 54 are mounted on horizontally extending shafts 61 and are positioned one above the other so as to straddle the lower reach of the conveyor. They are located near the idler sprockets 14 and 20 and are driven by means of a belt 62 which extends around a motor driven pulley 62a on the shaft 61 of the uppermost brush 54. The lowermost brush is driven by a belt 63 which extends around pulleys 64 on the shafts 61 and is crossed so that the brushes 54 are driven in opposite directions.

In operating the apparatus, current is supplied to the electric motor 29 so as to effect drive of the endless conveyor 7. The articles to be glazed are placed upon the setters as the latter move away from the idler sprockets 14 and 20. As the articles travel through the housing 42, they are subjected to sprays of the glazing material from the guns 37, 38, 39 and 40. By virtue of the fact that the guns are located above and below the upper reach of the conveyor, all surfaces of the articles are coated with the glazing material with the exception of the beads which are covered and protected by the setters. After travel through the exit passage of the housing 42, the articles are removed from the setters and are placed in a kiln or other heating apparatus for firing purposes, as well understood in the art. When the setters pass from the upper reach of the conveyor to the lower reach, they are subjected to the cleaning action of the brushes 53 and 54. These brushes, as previously pointed out, serve to clean or brush away the glazing material which adheres to the setters and the rods 22. Inasmuch as the setters 23 are attached removably to the rods 22 by the clips 25, it is possible, when articles of different shapes are to be glazed, to substitute different setters. The conveyor is preferably of such length that the glazing material, after application to the articles, dries before the articles are removed from the conveyor. If desired, an electric heater or similar heating apparatus may be used below the conveyor in order to facilitate drying of the glazing material during travel of the articles on the conveyor.

The herein described apparatus is extremely efficient in operation and serves materially to expedite the glazing operation of clay articles, in that it is not necessary, before subjecting the clay articles to the glazing material, to first harden them by a preliminary firing operation. By virtue of the fact that the setters conform in shape to, and receive, the foot-forming beads on the under faces of the articles, warpage or distortion of the articles is effectively avoided and there is no necessity for wiping off the beads after the glazing operation which has heretofore been done in dipping processes.

Whereas the apparatus has been described as being adapted primarily for use in connection with the glazing of articles in clay state, it is to be understood that it may be used equally as well in connection with the glazing of articles in biscuit state.

It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In an apparatus for glazing articles having foot-forming beads, the combination of a supporting structure, conveyor-means supported on said structure, setters for supporting the articles carried by the conveyor-means in series form and embodying channels for receiving and seating the foot-forming beads without applying pressure thereto, said setters serving to protect said bead and being shaped so that the articles may be lifted therefrom after glazing, means for spraying glazing material from different directions onto all the surface portions of the articles while said articles are supported on the setters, and means for driving the conveyor-means so as to cause the setters to bring the articles successively into the range of the spray-means for glaze-applying purposes.

2. In an apparatus for glazing articles having foot-forming beads, the combination of a supporting structure, a substantially horizontal endless conveyor supported on said structure so that it embodies upper and lower reaches, setters of rigid material for supporting the article for travel on the upper reach of the conveyor, carried by said conveyor in series form and embodying channels for receiving and seating the foot-forming beads without applying pressure thereto, said setters serving to protect said bead and being shaped so that the articles may be lifted therefrom after glazing, means above and below the upper reach of the conveyor for spraying glazing material onto all of the exposed surfaces of the articles while said articles are supported on the setters, and means for driving the conveyor so as to cause the setters to bring the articles successively into the range of the spray-means for glaze-applying purposes.

3. In an apparatus for glazing articles having foot-forming beads, the combination of a supporting structure, a substantially horizontal, endless conveyor supported on the structure so that it embodies upper and lower reaches, setters for supporting the articles for travel on the upper reach of the conveyor, carried by said conveyor in series form and embodying channels for receiving the foot-forming beads, said setters being so constructed and so arranged with respect to the conveyor that all surfaces of the articles except the beads are exposed and being shaped so that the channels thereof have upwardly divergent sides whereby the beads may be readily seated thereon and removed therefrom, means disposed above and below the upper reach of the conveyor for spraying glazing material onto the exposed surfaces of the articles while said articles are supported on the setters, and means for driving the conveyor so as to cause the setters to bring the articles successively into the range of the spray-means for glaze-applying purposes.

4. In an apparatus for glazing articles having foot-forming beads, the combination of a supporting structure, a substantially horizontal, foraminous, endless conveyor supported on the structure so that it embodies upper and lower reaches, setters operative to support the articles for travel on the upper reach of the conveyor and carried by said conveyor in series form, said setters embodying channels for receiving the foot-forming beads and being so constructed and so arranged with respect to the conveyor that all surfaces of the articles except the beads are exposed, means for spraying glazing material onto the articles while they are supported on the setters comprising a spray nozzle positioned above the upper reach of the conveyor and arranged to spray the material downwardly onto the articles, and a second spray nozzle positioned beneath the upper reach of the conveyor and adapted to spray the material upwardly through the conveyor onto the under surfaces of the articles, and means for driving the conveyor so as to cause the setters to bring the articles successively into the range of the spray nozzles for glaze-applying purposes.

5. In an apparatus for glazing articles having foot-forming beads, the combination of a supporting structure, a substantially horizontal, endless conveyor supported on said structure so that it embodies upper and lower reaches, setters for supporting the articles for travel on the upper reach of the conveyor, carried by said conveyor in series form and embodying channels for receiving the foot-forming beads and protecting them against the application of glazing material, means associated with the upper reach of the conveyor for spraying glazing material onto the articles while they are supported on the setters, means for driving the conveyor so as to cause the setters to bring the articles successively into contact with the spray-means, and means associated with the lower reach of the conveyor for cleaning the setters after they have been subjected to the aforesaid spray-means.

6. In an apparatus for glazing articles having foot-forming beads, the combination of a supporting structure, a substantially horizontal, endless conveyor supported on said structure so that it embodies upper and lower reaches, setters for supporting the articles for travel on the upper reach of the conveyor, carried by said conveyor in series form and embodying channels for receiving the foot-forming beads and protecting them against the application of glazing material, means associated with the upper reach of the conveyor for spraying glazing material onto the articles while they are supported on the setters, means for driving the conveyor so as to cause the setters to bring the articles successively into contact with the spray-means, and rotary brushes associated with the lower reach of the conveyor and operative to clean the setters after they have been subjected to the aforesaid spray-means.

7. In an apparatus for glazing articles having foot-forming beads, the combination of a supporting structure, an endless conveyor supported on said structure and comprising a pair of laterally spaced chains and cross rods carried by and extending between the chains, setters operative to support the articles and carried by the conveyor in series form, said setters embodying channels for receiving the foot-forming beads and being removably attached to the rods so that they may be removed and others substituted in their stead, means for applying glazing material to the articles while they are supported on the setters, and means for driving the conveyor so as to cause the setters to bring the articles successively into contact with the material-applying means.

8. In an apparatus for glazing articles having foot-forming beads, the combination of a supporting structure, an endless conveyor supported on said structure and comprising a pair of laterally spaced chains and cross rods carried by and extending between the chains, setters operative to support the articles and mounted on the conveyor in series form, said setters embodying channels for receiving the foot-forming beads and being provided with clips whereby they are attached removably to the cross rods, means for applying glazing material to the articles while they are supported on the setters, and means for driving the conveyor so as to cause the setters to bring the articles successively into contact with the material-applying means.

9. In an apparatus for glazing articles having foot-forming beads, the combination of a supporting structure, an endless conveyor supported on said structure and comprising a pair of laterally spaced chains and cross rods carried by and extending between the chains, setters for supporting the articles mounted on the cross rods in series form and embodying channels for receiving the foot-forming beads and protecting them against the application of glazing material, a plurality of spray nozzles positioned above and beneath the cross rods of the conveyor and arranged to spray glazing material onto the articles while they are supported on the setters, and means for driving the conveyor so as to cause the setters to bring the articles successively into the range of the nozzles.

10. In an apparatus for glazing articles having foot-forming beads, the combination of an endless conveyor supported on said structure so that it embodies upper and lower reaches and comprising a pair of laterally spaced chains and cross rods carried by and extending between the chains, setters for supporting the articles for travel on the upper reach of the conveyor, mounted on the cross rods in series form and embodying channels for receiving the foot-forming beads and protecting them against the application of glazing material, means associated with the upper reach of the conveyor for spraying glazing material onto the articles while they are supported on the setters, means for driving the conveyor so as to cause the setters to bring the articles successively into contact with the spray-means, and means associated with the lower reach of the conveyor for removing the glazing material from the setters after the latter have been subjected to the spray-means and the articles have been removed.

11. In an apparatus for glazing articles having foot-forming beads, the combination of an endless conveyor supported on said structure so that it embodies upper and lower reaches and comprising a pair of laterally spaced chains and cross rods carried by and extending between the chains, setters for supporting the articles for travel on the upper reach of the conveyor, mounted on the cross rods in series form and embodying channels for receiving the foot-forming beads and protecting them against the application of glazing material, spray nozzles above and below the upper reach of the conveyor for spraying glazing material onto the articles while they are supported on the setters, means for driving the conveyor so as to cause the setters to bring the articles successively into the range of the spray nozzles, and brush-means associated with the lower reach of the conveyor for cleaning the cross rods and setters after the articles have been removed from said setters.

12. As a new article of manufacture, a setter for use on an endless conveyor and in supporting for glazing purposes an article having a foot-forming bead, comprising a channeled band for receiving and covering only the foot-forming bead on the article and embodying clips on the band for attachment to the conveyor.

DELTA B. HOWELL.